United States Patent [19]

Cadalbert et al.

[11] Patent Number: 5,637,368

[45] Date of Patent: Jun. 10, 1997

[54] ADHESIVE TAPE HAVING ANTISTATIC PROPERTIES

[75] Inventors: David A. Cadalbert, Woodbury; Eric D. Morrison, West St. Paul; Tamara L. Johnson, Oakdale; William L. Kausch, Cottage Grove; David R. Boston, Woodbury; Wayne K. Larson, Maplewood; Steven T. Hedrick, Cottage Grove, all of Minn.

[73] Assignee: Minnesota Mining and Manufacturing Company, St. Paul, Minn.

[21] Appl. No.: 49,710

[22] Filed: Apr. 20, 1993

Related U.S. Application Data

[63] Continuation-in-part of Ser. No. 893,279, Jun. 4, 1992, Pat. No. 5,427,835.

[51] Int. Cl.$^6$ .................................. B32B 33/00; C09D 5/24
[52] U.S. Cl. ..................... 428/40.1; 442/110; 252/511; 428/41.7; 428/41.8; 428/41.9; 428/236; 428/261; 428/323; 428/330; 428/346; 428/354; 428/355 R; 428/356; 428/409; 428/411.1; 428/698; 428/906; 430/527; 524/910; 524/911
[58] Field of Search ..................... 428/40, 354, 355, 428/356, 344, 343, 346, 906, 236, 261, 409, 411.1, 698, 330, 323; 252/511; 524/910, 911; 430/527

[56] References Cited

U.S. PATENT DOCUMENTS

| | | | |
|---|---|---|---|
| Re. 24,906 | 12/1960 | Ulrich | 206/59 |
| 3,146,882 | 9/1964 | Wallner et al. | 206/59 |
| 3,347,362 | 10/1967 | Rabuse | 428/194 |
| 3,389,827 | 6/1968 | Abere et al. | 220/53 |
| 3,624,034 | 11/1971 | Price | 260/49 |
| 3,734,874 | 5/1973 | Kibler et al. | 260/29.2 E |
| 3,779,993 | 12/1973 | Kibler et al. | 260/75 S |
| 3,821,281 | 6/1974 | Radlmann et al. | 260/470 |
| 3,833,457 | 9/1974 | Misumi et al. | 161/170 |
| 3,998,870 | 12/1976 | Carlson | 260/470 |
| 4,052,368 | 10/1977 | Larson | 260/75 R |
| 4,080,348 | 3/1978 | Korpman | 260/27 BB |
| 4,104,262 | 8/1978 | Schade | 528/295 |
| 4,132,552 | 1/1979 | Van Paesschen | 428/483 |
| 4,136,071 | 1/1979 | Korpman | 260/27 BB |
| 4,145,327 | 3/1979 | Dolch et al. | 260/29.6 |
| 4,203,769 | 5/1980 | Guestaux | 430/631 |
| 4,304,705 | 12/1981 | O'Neill et al. | 528/290 |
| 4,307,219 | 12/1981 | Larson | 528/71 |
| 4,330,588 | 5/1982 | Larson et al. | 428/264 |
| 4,408,008 | 10/1983 | Markusch | 524/591 |
| 4,478,907 | 10/1984 | Van Gossum et al. | 428/327 |
| 4,503,198 | 3/1985 | Miyai et al. | 525/440 |
| 4,558,149 | 12/1985 | Larson | 560/14 |
| 4,585,730 | 4/1986 | Cho | 430/527 |
| 4,638,017 | 1/1987 | Larson et al. | 521/157 |
| 4,738,992 | 4/1988 | Larson et al. | 521/157 |
| 4,746,717 | 5/1988 | Larson | 528/68 |
| 4,792,584 | 12/1988 | Shiraki et al. | 524/77 |
| 4,855,384 | 8/1989 | Larson | 528/60 |
| 4,883,179 | 11/1989 | Dionne | 206/523 |
| 4,952,650 | 8/1990 | Young et al. | 526/194 |
| 4,978,740 | 12/1990 | Kawamoto et al. | 528/272 |
| 5,006,451 | 4/1991 | Anderson et al. | 430/527 |
| 5,203,884 | 4/1993 | Buchanan et al. | 51/295 |
| 5,378,405 | 1/1995 | Gutman | 428/355 |
| 5,427,835 | 6/1995 | Morrison | 428/96 |

FOREIGN PATENT DOCUMENTS

| | | |
|---|---|---|
| 0422919A3 | 4/1991 | European Pat. Off. . |
| 0435080A1 | 7/1991 | European Pat. Off. . |
| 54-152197 | 11/1979 | Japan . |
| 62-030619 | 2/1987 | Japan . |
| 01294306 | 11/1989 | Japan . |
| 05119433A | 5/1993 | Japan . |
| 2032405 | 5/1980 | United Kingdom . |
| WO93/24322 | 6/1992 | WIPO . |

OTHER PUBLICATIONS

"Aqueous Dispersions of Crosslinked Polyurethanes", R. E. Tirpak and P. H. Markusch; *Journal of Water Borne Coatings*, Nov. 1986, pp. 12–22.

"Mixed–Valence Polyvanadic Acid Gels," Gharbi et al., *Inorg. Chem.*, 21, (1982), pp. 2758–2765.

"Electric Moments of the Simple Alkyl Orthovanadates," Cartan et al., *J. Phys. Chem.*, 64, (1960), pp. 1756–1768.

"Synthesis of Amorphous Vanadium Oxide from Metal Alkoxide," Hioki et al., *Nippon Seramikkusa Kyokai Gakujutsu Ronbunshi*, 97, (6), (1989), pp. 628–633 (English abstract provided).

"Synthesis of $V_2O_5$ Gels from Vanadyl Alkoxides," Hirashima et al. *Nippon Seramikkusu Kyokai Gakujutsu Ronbunshi*, 97, (1989), (3), pp. 235–238.

"Vanadium Pentoxide Gels," Livage, *Chem. Mater.*, 3, (1991), pp. 578–593.

"Sol–Gel Synthesis of Vanadium Oxide from Alkoxides," Nabavi et al., *Eur. J. Solid State Inorg. Chem.*, 28, (1991), pp. 1173–1192.

Abstract for "Colloidal Vanadium Pentoxide," Ostermann, *Wiss. U. Ind.*, I, (1922) pp. 17–19.

"Synthesis and Characterization of Vanadium Oxide Gels from Alkoxy–Vanadate Precursors," Sanchez et al., *Mat. Res. Soc., Symp. Proc.*, 121, (1988) pp. 93–104.

"The Preparation of Colloidal Vanadic Acid," Wegelin, *Z. Chem. Ind. Kolloide*, 2, (1912), pp. 25–28; and English abstract therefor.

Abstract for "Vanadic Acid Esters and Some Other Organic Vanadium Compounds," Prandtl et al., *Z. Anorg. Chem.*, 82, pp. 103–129.

"Preparation of Colloidal Vanadic Acid by a New Dispersion Method," Mueller, *Z. Chem. InD. Kolloide*, 8, (1911), pp. 302–303; and English abstract therefor.

*Primary Examiner*—Nasser Ahmad
*Attorney, Agent, or Firm*—Gary L. Griswold; Walter N. Kirn; James V. Lilly

[57] ABSTRACT

An antistatic adhesive article which comprises an adhesive layer and utilizes vanadium oxide to impart antistatic properties to the article. The article is preferably an adhesive tape or sheet. The adhesive may be pressure sensitive or non-pressure sensitive. The vanadium oxide may be incorporated into or onto the tape from an aqueous dispersion.

31 Claims, No Drawings

ADHESIVE TAPE HAVING ANTISTATIC PROPERTIES

CROSS REFERENCE TO RELATED APPLICATION

This is a continuation-in-part of application U.S. Ser. No. 07/893,279 filed Jun. 4, 1992 now U.S. Pat. No. 5,427,835.

FIELD OF THE INVENTION

This invention relates to adhesive tapes and sheets that employ a vanadium oxide as an antistatic component.

BACKGROUND OF THE INVENTION

A build-up of electrical charges, known as "static electricity", can discharge suddenly and cause undesirable sparking particularly in rolled up articles such as adhesive tapes and sheets. It is known in the art that antistatic materials can avoid or compensate for the build-up of static electricity.

There is a growing interest in the use of antistatic materials and coatings in various fields of technology, particularly in the electronics industry. For example, in electronics manufacturing, electrostatic discharge can result in expensive and difficult to detect damage to electronic components. Build-up of electrical charges can also result in difficulties in handling and attraction of dust and debris.

Adhesive tapes, particularly pressure sensitive adhesive tapes, are useful in electronics manufacturing, for example in masking and packaging applications. Tape handling (e.g., unwinding) can result in the generation of very high electrostatic charges which are greatly in excess of that required to damage typical electronic components. Before such pressure sensitive adhesive tapes are brought into contact with electronic components, as in, for example, a masking operation, the electrostatic charge on the tape must be removed. Conventionally this is done by the action of ionized air on the tape. Frequently, however, this is only a temporary solution.

Various materials have been suggested for use as an antistatic layer. For example, vanadium oxide dispersions have been reported to be effective antistatic layers in photographic constructions. Additionally, aqueous copolyester dispersions which contain ionic antistatic agents, such as monosodium salt of vanadic acid, have been reported as useful with photographic media.

SUMMARY OF THE INVENTION

Briefly, the present invention provides an adhesive tape or sheet which employs a vanadium oxide, preferably a colloidal vanadium oxide, as an antistatic coating or layer. Antistatic coatings derived from aqueous dispersions of vanadium oxide are particularly desirable because they avoid environmental and waste disposal problems associated with organic solvents. Colloidal dispersions of vanadium oxide useful in the present invention provide a highly dispersed form of vanadium oxide which exhibits desirable morphology, particle size, and dispersion properties useful for the preparation of tapes and sheets.

The tape or sheet of the invention is typically self-supporting and comprises an optional support layer, an adhesive layer and a vanadium oxide layer. The tape or sheet may have either a single exposed adhesive surface or two exposed adhesive surfaces. Moreover, the vanadium oxide layer may be present anywhere in the construction. Thus, for example, it may be between the support, if one is used, and the adhesive; over the adhesive; as a component of the adhesive composition; or on the surface of the optional support that is opposite the surface bearing the adhesive.

Tape or sheet of the invention may also employ low adhesion backsize layers, primer layers, and the like. The vanadium oxide layer may be present on these layers or between any of these layers and the layer or layers adjacent to it.

In another aspect of the invention, a sulfopolymer is used in conjunction with the vanadium oxide layer. The sulfopolymer may be mixed with vanadium oxide or provided as a layer either over or under the vanadium oxide layer.

Mixtures of dispersions of vanadium oxide and sulfopolymers form coatings which have excellent chemical and mechanical durability and impart antistatic properties to a substrate. The coatings are generally colorless or have very low color, and, if desired, are homogeneous. Furthermore, they adhere well to substrates. Additionally, properties of the sulfopolymers such as stain resistance, adhesion to subsequently coated layers, and release are not adversely affected by the presence of vanadium oxide. A further surprising result is that remarkably low levels of vanadium oxide sol produce extremely effective antistatic behavior. Effective antistatic properties can be provided with low or no surface concentrations of vanadium oxide.

Antistatic articles and coatings of the present invention impart desirable properties such as: reduced tendency to attract dust; prevention of the formation of static tracks; reduced tendency for sparking or damaging electronic components; reduced tape and sheet handling difficulties; and non-dependence upon humidity.

In this application:

"colloidal vanadium oxide" means a colloidal dispersion of single or mixed valence vanadium oxide, wherein the formal oxidation states of the vanadium ions are typically +4 and +5. In the art, such species are often referred to as $V_2O_5$. In the aged colloidal form (several hours at 80° C. or more or several days at room temperature), vanadium oxide consists of dispersed fibrillar particles of vanadium oxide which preferably have a thickness in the range of 0.02–0.08 micrometers and length up to about 4 micrometers;

"sulfopolymer" or "sulfonated polymer" means a polymer comprising at least one unit containing a salt of a —$SO_3H$ group, preferably alkali metal or ammonium salt;

"dispersed sulfonated polymer" means a solution or dispersion of a polymer in water or aqueous-based liquids; particles can be dissolved or they can be dispersed in the liquid medium and can have a maximum dimension of 1 to 10 micrometers; and "sol", "colloidal dispersion", and "colloidal solution" are used interchangeably and unless otherwise stated mean a uniform suspension of finely divided particles in a continuous liquid medium.

DETAILED DESCRIPTION

Colloidal dispersions of vanadium oxide can be prepared as disclosed in U.S. Pat. No. 4,203,769, and in the copending application U.S. Ser. No. 07/893,504, filed Jun. 4, 1992. Both of these documents are incorporated herein by reference with respect to the preparation of such dispersions.

U.S. Ser. No. 07/893,504 discloses the preparation of vanadium oxide colloidal dispersions by the addition of vanadium oxide trialkoxides ($VO(OR)_3$) to a molar excess of water and, optionally, hydrogen peroxide. The hydrolysis and condensation process is conveniently carried out at room temperature, and may be modified by the addition of co-reagents, addition of metal dopants, by subsequent aging or heat treatments, and removal of alcohol by-products. By such modifications the vanadium pentoxide dispersion properties may be varied. The process provides a dispersed form of vanadium pentoxide which is extremely effective for the preparation of antistatic coatings.

The comparative examples of U.S. Ser. No. 07/893,504 disclose the preparation of vanadium oxide colloidal dispersions by the acidification of vanadate salts, by the reaction of hydrogen peroxide with vanadium pentoxide, by hydrolysis of vanadium compounds such as halides.

The vanadium oxide colloidal dispersions of U.S. Pat. No. 4,203,769 and U.S. Ser. No. 07/893,504 are similar except the $V^{4+}$ concentrations of the latter are higher and can be controlled. Other advantages of the latter include: energy savings, convenience, elimination of conditions whereby highly toxic vanadium-containing fumes may be generated, no need to filter resultant colloidal dispersions, and ability to prepare colloidal dispersions in situ (in polymer solution).

Most preferred vanadium oxide sols, i.e., colloidal dispersions, useful in the present invention are prepared by hydrolyzing vanadium oxoalkoxides with a molar excess of deionized water. In preferred embodiments, the vanadium oxoalkoxides are prepared in situ from a vanadium oxide precursor species and an alcohol. The vanadium oxide precursor species is preferably a vanadium oxyhalide or vanadium oxyacetate. If the vanadium oxoalkoxide is prepared in situ, the vanadium oxoalkoxide may also include other ligands such as acetate groups.

Preferably, the vanadium oxoalkoxide is a trialkoxide of the formula $VO(OR)_3$, wherein each R is independently an aliphatic, aryl, heterocyclic, or arylalkyl group. Preferably, each R is independently selected from the group consisting of $C_{1-10}$ alkyls, $C_{1-10}$ alkenyls, $C_{1-10}$ alkynyls, $C_{1-18}$ aryls, $C_{1-18}$ arylalkyls, or mixtures thereof, which can be substituted or unsubstituted. "Group" means a chemical species that allows for substitution or which may be substituted by conventional substituents which do not interfere with the desired product. More preferably, each R is independently an unsubstituted $C_{1-6}$ alkyl. When it is said that each R is "independently" selected from a group, it is meant that not all R groups in the formula $VO(OR)_3$ are required to be the same.

In the context of the present invention, the term "aliphatic" means a saturated or unsaturated linear, branched, or cyclic hydrocarbon or heterocyclic radical. This term is used to encompass alkyls, alkenyls such as vinyl radicals, and alkynyls, for example. The term "alkyl" means a saturated linear, cyclic or branched hydrocarbon radical. The term "alkenyl" means a linear, branched, or cyclic hydrocarbon radical containing at least one carbon-carbon double bond. The term "alkynyl" means a linear or branched hydrocarbon radical containing at least one carbon-carbon triple bond. The term "heterocyclic" means a mono- or polynuclear cyclic radical containing carbon atoms and one or more heteroatoms such as nitrogen, oxygen, sulfur or a combination thereof in the ring or rings, such as furan, thymine, hydantoin, and thiophene. The term "aryl" means a mono- or polynuclear aromatic hydrocarbon radical. The term "arylalkyl" means a linear, branched, or cyclic alkyl hydrocarbon radical having a mono- or polynuclear aromatic hydrocarbon or heterocyclic substituent. The aliphatic, aryl, heterocyclic, and arylalkyl groups can be unsubstituted, or they can be substituted with various groups such as Br, Cl, F, I, OH groups, or other groups which do not interfere with the desired product.

The hydrolysis process results in condensation of the vanadium oxoalkoxides to vanadium oxide colloidal dispersions. It can be carried out in water within a temperature range in which the solvent, which preferably is deionized water or a mixture of deionized water and a water-miscible organic solvent, is in a liquid form, e.g., within a range of about 0°–100° C. The process is preferably and advantageously carried out within a temperature range of about 20°–30° C., i.e., at about room temperature. The hydrolysis preferably involves the addition of a vanadium oxoalkoxide to deionized water.

In most preferred embodiments, the deionized water or mixture of deionized water and water-miscible organic solvents contains an effective amount of a hydroperoxide, such as $H_2O_2$. In preferred embodiments the deionized water and hydroperoxide are combined with a water-miscible organic solvent, such as a low molecular weight ketone or an alcohol. Optionally, the reaction mixture also can be modified by the addition of co-reagents, addition of metal dopants, by subsequent aging or heat treatments, and removal of alcohol by-products. By such modifications the vanadium oxide colloidal dispersion properties can be varied.

The vanadium oxoalkoxides can also be prepared in situ from a vanadium oxide precursor species in aqueous medium and an alcohol. For example, the vanadium oxoalkoxides can be generated in the reaction flask in which the hydrolysis, and subsequent condensation, reactions occur. That is, the vanadium oxoalkoxides can be generated by combining a vanadium oxide precursor species, such as, for example, a vanadium oxyhalide ($VOX_3$), preferably $VOCl_3$, or vanadium oxyacetate ($VO_2OAc$), with an appropriate alcohol, such as i-BuOH, i-PrOH, n-PrOH, n-BuOH, t-BuOH, and the like, wherein Bu=butyl and Pr=propyl. It is understood that if vanadium oxoalkoxides are generated in situ, they may be mixed alkoxides. For example, the product of the in situ reaction of vanadium oxyacetate with an alcohol is a mixed alkoxide/acetate. Thus, herein the term "vanadium oxoalkoxide" is used to refer to species that have at least one alkoxide (—OR) group, particularly if prepared in situ. Preferably, the vanadium oxoalkoxides are trialkoxides with three alkoxide groups.

The in situ preparations of the vanadium oxoalkoxides are preferably carried out under an inert atmosphere, such as nitrogen or argon. The vanadium oxide precursor species is typically added to an appropriate alcohol at room temperature. When the reaction is exothermic, it is added at a controlled rate such that the reaction mixture temperature does not greatly exceed room temperature. The temperature of the reaction mixture can be further controlled by placing the reaction flask in a constant temperature bath, such as an ice water bath. The reaction of the vanadium oxide species and the alcohol can be done in the presence of an oxirane, such as propylene oxide, ethylene oxide, or epichlorohydrin, and the like. The oxirane is effective at removing by-products of the reaction of the vanadium oxide species, particularly vanadium dioxide acetate and vanadium oxyhalides, with alcohols. If desired, volatile starting materials and reaction products can be removed through distillation or evaporative techniques, such as rotary evaporation. The resultant vanadium oxoalkoxide product, whether in the form of a solution or a solid residue after the use of distillation or evaporative techniques, can be added directly to water to produce the vanadium oxide colloidal dispersions.

A preferred method of making the colloidal dispersion involves adding a vanadium oxoalkoxide to a molar excess of water, preferably with stirring until a homogeneous colloidal dispersion forms. By a "molar excess" of water, it is meant that a sufficient amount of water is present relative to the amount of vanadium oxoalkoxide such that there is greater than a 1:1 molar ratio of water to vanadium-bound alkoxide. Preferably, a sufficient amount of water is used such that the final colloidal dispersion formed contains less than about 4.5 wt percent and at least a minimum effective amount of vanadium. This typically requires a molar ratio of water to vanadium alkoxide of at least about 45:1, and preferably at least about 150:1. Herein, by "minimum effective amount" of vanadium it is meant that the colloidal dispersion contains an amount of vanadium in the form of vanadium oxide, whether diluted or not, which is sufficient to form an effective sulfonate group-containing polymeric antistatic coating for the use desired.

In preparing the preferred vanadium oxide colloidal dispersion of the present invention, a sufficient amount of water is used such that the colloidal dispersion formed contains about 0.05 weight percent to about 3.5 weight percent vanadium. Most preferably, a sufficient amount of water is used so that the colloidal dispersion formed upon addition of the vanadium-containing species contains about 0.6 weight percent to about 1.7 weight percent vanadium. Preferably, the water used in methods of the present invention is deionized water.

In processes of making the colloidal dispersion, the vanadium oxoalkoxides are preferably hydrolyzed by adding the vanadium oxoalkoxides to the water, as opposed to adding the water to the vanadium oxoalkoxides. This is advantageous because it typically results in the formation of a desirable colloidal dispersion and generally avoids excessive gelling.

As long as there is a molar excess of water used in the hydrolysis and subsequent condensation reactions of the vanadium oxoalkoxides, water-miscible organic solvents can also be present. That is, in certain preferred embodiments the vanadium oxoalkoxides can be added to a mixture of water and a water-miscible organic solvent. Miscible organic solvents include, but are not limited to, alcohols, low molecular weight ketones, dioxane, and solvents with a high dielectric constant, such as acetonitrile, dimethylformamide, dimethylsulfoxide, and the like. Preferably, the organic solvent is acetone or an alcohol, such as i-BuOH, i-PrOH, n-PrOH, n-BuOH, t-BuOH, and the like.

Preferably, the reaction mixture also contains an effective amount of hydroperoxide, such as $H_2O_2$ or t-butyl hydrogen peroxide. An "effective amount" of a hydroperoxide is an amount that positively or favorably effects the formation of a colloidal dispersion capable of producing an antistatic coating with an effective antistatic coating value of $[V]_{eff}$ defined below, of less than about 2.0 mg/m$^2$. The presence of the hydroperoxide appears to improve the dispersive characteristics of the colloidal dispersion and facilitate production of an antistatic coating with highly desirable properties. That is, when an effective amount of hydroperoxide is used the resultant colloidal dispersions are less turbid, and more well dispersed. Preferably, the hydroperoxide is present in an amount such that the molar ratio of vanadium oxoalkoxide to hydroperoxide is within a range of about 1:1 to 4:1.

Other methods known for the preparation of vanadium oxide colloidal dispersions, which are less preferred, include inorganic methods such as ion exchange acidification of $NaVO_3$, thermohydrolysis of $VOCl_3$, and reaction of $V_2O_5$ with $H_2O_2$. To provide coatings with effective antistatic properties from dispersions prepared with inorganic precursors typically requires substantial surface concentrations of vanadium, which generally results in the loss of desirable properties such as transparency, adhesion, and uniformity.

For most uses, an effective antistatic coating has a coating weight of vanadium ($[V]_{eff}$, calculated in mg of vanadium per m$^2$ of substrate surface area) of less than about 12 mg/m$^2$; however, for some end uses a value of $[V]_{eff}$ up to about 20 mg/m$^2$ can be tolerated. For preferred uses, however, it is desirable that the antistatic coating have a $[V]_{eff}$ of less than about 6 mg/m$^2$, and preferably the value of $[V]_{eff}$ is less than about 3 mg/m$^2$. Generally, lower coating weights of vanadium for effective conduction of electrostatic charges are advantageous and commercially desirable because lower coating weight vanadium oxide coatings are generally less colored, more uniform, more economical and may possess better adhesion properties than coatings with higher concentration of vanadium. Thickness of the final coating is more dependent on the concentration of polymer rather than the concentration of $V_2O_5$.

The value of $[V]_{eff}$ is the calculated coating weight of vanadium required to provide electrostatic charge decay times of less than 0.10 second for decay of a 5000 V potential to less than 50 V. The surface concentration of vanadium in the antistatic coatings of the present invention can be calculated from formulation data, assuming 100% conversion of the vanadium oxoalkoxide to the vanadium oxide colloidal dispersion, and also assuming the density of each successively diluted vanadium oxide colloidal dispersion is that of water (1.0 g/mL), and the wet coating thickness, when applied using a No. 3 Mayer Bar, is about 6.9 μm.

The colloidal dispersion of vanadium oxide may be employed by itself or combined with other materials in the practice of the invention. Thus, in another aspect of the invention, a sulfopolymer is combined with the dispersion. A wide variety of sulfopolymers can be employed with the colloidal dispersion of the present invention. Preferred sulfopolymers of use in the compositions and articles of the present invention have been disclosed in, for example, U.S. Pat. Nos. 4,052,368, 4,307,219, 4,330,588, 4,558,149, 4,738,992, 4,746,717, and 4,855,384 which are incorporated herein by reference for the composition and preparation of sulfopolymers and sulfocompounds. Disclosed in these patents are polymers including sulfopolyols, (e.g., sulfopolyester polyols and sulfopolyether polyols), sulfopolyesters, ethylenically-unsaturated sulfopolymers, sulfopolyurethanes, sulfopolyurethane/polyureas.

Also useful are commercially available sulfonate-containing polymers such as poly(sodiumstyrene sulfonate) available from Polyscience, Inc., Warrington, Pa., and alkylene oxide-co-sulfonate-containing polyester (AQ™ resins, Eastman Kodak Co., Kingsport, Tenn.).

Sulfopolyols are known in the literature. Preparation of these Sulfopolyols is disclosed, for example, in U.S. Pat. Nos. 4,503,198, 4,558,149, and 4,738,992.

Sulfopolyesters useful in the invention are known in the literature. In some instances, these sulfopolyesters are dispersed in water in conjunction with an emulsifying agent and high shear to yield a stable emulsion; sulfopolyesters may also be completely water soluble. Additionally, stable dispersions may be produced in instances where sulfopolyesters are initially dissolved in a mixture of water and an organic cosolvent, with subsequent removal of the cosolvent yielding an aqueous sulfopolyester dispersion.

Sulfopolyesters disclosed in U.S. Pat. Nos. 3,734,874, 3,779,993, 4,052,368, 4,104,262, 4,304,901, 4,330,588, for example, relate to low melting (below 100° C.) or noncrystalline sulfopolyesters which may be dispersed in water according to methods mentioned above.

Water dispersible sulfopolyurethanes or sulfopolyurethane/ureas useful in the invention are known in the literature. Sulfopolyurethanes may be synthesized by a wide variety of methods. In general, one major class of random, linear sulfopolyurethanes as are disclosed in U.S. Pat. No. 4,307,219.

The sulfopolyurethanes useful in this invention can be prepared by standard techniques beginning with the preparation of the hydrophilic diol from the diesterification reaction of a sulfoacid and a diol as described in U.S. Pat. No. 4,307,219. The aqueous dispersible sulfopolyurethanes are then prepared by the coreaction of the diisocyanate with the hydrophilic diol, hydrophobic diol, and where used, chain-extenders under essentially anhydrous conditions in an organic solvent such as methyl ethyl ketone or tetrahydrofuran, as described in U.S. Pat. No. 4,307,219.

Other representative methods for making sulfopolyurethane dispersions are disclosed in a review article "Aqueous Dispersions of Crosslinked Polyurethanes" (R. E. Tirpak and P. H. Markusch; Journal of Water Borne Coatings, November 1986, pp.12–22), and U.S. Pat. Nos. 4,307,219, 4,408,008, and 3,998,870. Methods of preparing sulfonate containing polyurethane dispersions described in these references include the use of sulfonate containing polyethyleneoxide monoalcohols, sulfonate containing diamines, low molecular weight sulfonic acid containing diols which are the reaction product of sodium bisulfite and alkene containing diols, and sulfonic acid containing isocyanates in conjunction with diols, di- or tri-amines, and diisocyanates as described above. The general method of preparation varies according to the sulfonated molecule used as taught in the references cited above.

Water dispersible ethylenically unsaturated sulfocompounds useful in the invention are known in the literature, for example U.S. Pat. Nos. 4,503,198, 4,558,149, 4,746,717, and 4,855,384.

Adhesives useful in the present invention as the adhesive layer include pressure sensitive and non-pressure sensitive adhesives. The former category is a preferred class of adhesives for use in the invention. They are normally tacky at room temperature and can be adhered to a surface by application of, at most, light finger pressure. The latter class of adhesives include solvent, heat or radiation activated adhesive systems.

The adhesives useful in the invention may generally be based on general compositions of polyacrylate; polyvinyl ether; rubber such as natural rubber; isoprene; polychloroprene; butyl rubber; polyisobutylene; butadiene-acrylonitrile polymer, thermoplastic elastomer, and styrene-butadiene polymer; poly-alpha-olefin; amorphous polyolefin; silicone; ethylene-containing copolymer such as ethylene vinyl acetate, ethyl ethylacrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, curatives, and solvents.

A general description of useful pressure-sensitive adhesives may be found in *Encyclopedia of Polymer Science and Engineering*, Vol. 13, Wiley-Interscience Publishers (New York, 1988).

Additional description of useful pressure-sensitive adhesives may be found in *Encyclopedia of Polymer Science and Technology*, Vol. 1, Interscience Publishers (New York, 1964).

Other pressure-sensitive adhesives useful in the invention are described in the patent literature. Examples of these patents include Re 24,906 (Ulrich), U.S. Pat. No. 3,389,827 (Abere et al at Col. 4-Col. 5), U.S. Pat. No. 4,080,348 (Korpman), U.S. Pat. No. 4,136,071 (Korpman), U.S. Pat. No. 4,792,584 (Shiraki et al), U.S. Pat. No. 4,883,179 (Young et al), and U.S. Pat. No. 4,952,650 (Young et al).

Commercially available pressure-sensitive adhesives are also useful in the invention. Examples of these adhesives include the hot melt pressure-sensitive adhesives available from H. B. Fuller Company, St. Paul, Minnesota as HM-1597, HL-2207-X, HL-2115X, HL-2193-X. Other useful commercially available pressure-sensitive adhesives include those available from Century Adhesives Corporation, Columbus, Ohio.

Additionally the adhesive can contain additives such as tackifiers, plasticizers, fillers, antioxidants, stabilizers, pigments, curatives, crosslinkers, solvents, etc.

A support layer may, optionally, be utilized in the practice of the present invention. It can be treated or untreated paper such as crepe, rope tissue, repulpable tissue, and kraft; woven fabric such as cotton, rayon, polyester, glass, and nylon; polymeric film such as cellophane, acetate, polyester, vinyl, polyvinyl chloride, polypropylene, polyethylene, and polyimide; nonwoven fabric such as a polymer scrim or web; foil such as aluminum, stainless steel, and lead; foam such as open and closed cell polyethylene, polyvinyl chloride, polyurethane, and polychloroprene; rubber, such as neoprene; metallized film, or combinations of the above, i.e. laminates. The backings can be compounded further with fibers, fillers, plasticizers, pigments, stabilizers, antioxidants, or mixtures thereof. The backings may additionally bear a primer layer or be surface treated, e.g. corona treated, to promote adhesion of other components to it; undergo an orientation step to improve its tensile strength; or be coated with a low adhesion backsize material to prevent bonding/transfer of the adhesive to the opposite side of the tape or sheet when the tape or sheet is in the form of a roll.

The tape and sheet of the invention may be prepared by a variety of techniques. For example, a support layer can be coated with an adhesive after which the antistatic material may be applied either directly over the adhesive or to the opposite surface of the backing. Alternatively, the antistatic layer may either be applied over the adhesive or to the opposite surface of a tape backing. Additionally, the antistatic layer may be incorporated into the adhesive layer.

Techniques for applying the adhesive include solvent coating (either from organic solvents or water), emulsion coating, hot melt coating, simultaneous extrusion of the adhesive and the support, calendaring curtain coating, gravure coating, spray coating, and the like.

Likewise, the antistatic coating may be applied by a variety of techniques. These techniques include Mayer bar coating, dip coating, spin coating, roll coating, curtain coating, spray coating, and the like.

The antistatic coating composition may be subjected to an aging process by storing it in a constant temperature bath until a thixotropic colloidal dispersion is formed. The antistatic coating may also be diluted with water or a water miscible organic solvent prior to application to the substrate. Additionally, a surfactant may be added to the antistatic coating composition to aid in achieving uniform wetting of the surface to be coated.

When the antistatic coating includes the sulfopolymer, it can be prepared by dispersing the sulfopolymer in water, optionally with water-miscible cosolvent (generally less than 50 weight percent cosolvent). The dispersion can contain more than zero and up to about 50 percent by weight sulfo-containing polymer, preferably in the range of 10 to 25 weight percent sulfo-containing polymer. Organic solvents miscible with water can be added. Examples of such organic solvents that can be used include acetone, methyl ethyl ketone, methanol, ethanol, and other. alcohols and ketones. The presence of such solvents is desirable when need exists to alter the coating characteristics of the coating solution.

For preparation of the mixture of colloidal vanadium oxide and sulfonate-containing polymer a most preferred colloidal dispersion of vanadium oxide can be prepared, as noted above, by the hydrolysis of a vanadium oxoalkoxide with a molar excess of deionized water. These dispersions can be brown in color, thus imparting a yellow or brown tint to the final coating. A preferred preparation is the addition of vanadium iso-butoxide to a hydrogen peroxide solution, as described in detail below.

The sulfopolymer/vanadium oxide compositions of the present invention can comprise any ratio of these components. For ease of coatability, these compositions preferably comprise more than zero (as little as about 0.05 weight percent, preferably as little as 0.15 weight percent, dried solids can be useful) and up to about 15 percent by weight solids. More preferably, the compositions comprise more than zero and up to 10 weight percent solids, and most preferably more than zero and up to 6 weight percent solids. In the dried solids there can be in the range of 0.2 to 80 weight percent vanadium oxide and 20 to 99.8 weight percent sulfopolymer, preferably 0.2 to 50 weight percent vanadium oxide and 50 to 99.8 weight percent sulfopolymer, most preferably 0.5 to 20 weight percent vanadium oxide and 80 to 99.5 weight percent sulfopolymer, based on total dried solids. It is to be appreciated that vanadium accounts for about 56 percent of the molecular weight of $V_2O_5$, so weight percent of vanadium can be readily calculated by multiplying weight percent $V_2O_5$ by 0.56.

The vanadium oxide dispersion can be diluted with deionized water to a desired concentration before mixing with the aqueous sulfopolymer dispersions. Dispersions containing very small amounts of vanadium oxide can provide useful coatings for the present invention. In all cases the amount of vanadium oxide present is sufficient to confer antistatic properties to the final coating or article. The use of deionized water avoids problems with flocculation of the colloidal particles in the dispersions. Deionized water has had a significant amount of Ca(2+) and Mg(2+) ions removed. Preferably, the deionized water contains less than about 50 ppm of these multivalent cations, most preferably less than 5 ppm.

The sulfopolymer dispersion and the vanadium oxide dispersion are mixed together. Generally, this involves stirring the two dispersions together for sufficient time to effect complete mixing. If other materials or particles are to be incorporated into the coating mixture, however, it is frequently more convenient to stir the mixture for several hours by placing the mixture into a glass jar containing several glass beads and roll milling it. Surfactants can be added at the mixing step. Any water compatible surfactant, except those of high acidity or basicity or complexing ability, or which otherwise would interfere with the desired product, is suitable for the practice of this invention. A suitable surfactant does not alter the antistatic characteristics of the coating, but allows for the uniform wetting of a substrate surface by the coating solution. Depending upon the substrate, wetting out completely can be difficult, so it is sometimes convenient to alter the coating composition by the addition of organic solvents. It is apparent to those skilled in the art that the addition of various solvents is acceptable, as long as it does not cause flocculation or precipitation of the sulfopolymer or the vanadium oxide.

Alternatively, the vanadium oxide dispersion can be generated in the presence of a sulfopolymer or prepolymer by, for example, the addition of $VO(OiBu)_3$ (vanadium triisobutoxide oxide) to a dispersion of polymer, optionally containing hydrogen peroxide, and aging this mixture at 50° C. for several hours to several days. In this way, colloidal vanadium oxide dispersions can be prepared in situ with dispersions with which they might otherwise be incompatible, as evidenced by flocculation of the colloidal dispersion. Alternatively, this method simply may be a more convenient preparation method for some dispersions.

The coatings prepared from the sulfopolymer/vanadium oxide colloidal dispersions typically contain whisker shaped colloidal particles of vanadium oxide. These particles can have a high aspect ratio, (i.e., greater than 10 and even as high as.200) and are generally evenly distributed. The colloidal particles were examined by field emission scanning electron microscopy. The micrographs showed evenly dispersed, whisker-shaped colloidal particles of vanadium oxide, approximately 0.02 to 0.08 micrometers wide and 1.0 to 4.0 micrometers long.

Once the dispersion, whether or not it contains the sulfopolymer, is coated out, the coated film can be dried, generally at a temperature from room temperature up to a temperature limited by substrate and sulfopolymers, preferably room temperature to 200° C., most preferably 50° to 150° C., for a few minutes. The dried coating weight preferably can be in the range of 3 mg/m$^2$ to 20 g/m$^2$.

Objects and advantages of this invention are further illustrated by the following examples, but the particular materials and amounts thereof recited in these examples, as well as other conditions and details, should not be construed to unduly limit this invention.

In the Examples below, all percents are by weight unless otherwise indicated below.

EXPERIMENTAL

The present invention is further described in the following examples. In these examples certain tests were performed to demonstrate the antistatic characteristics and adhesion properties of the invention. These tests were as follows:

Antistatic Properties

In the Examples below, the antistatic properties of the adhesive tapes and sheets were measured by determining the charge decay time of the coated sample; i.e., by applying voltage and measuring the time required for the charge to dissipate. This measurement was done on a Static Decay Meter (Model 406C, Electro-Tech Systems, Inc., Glenside, Pa.), wherein the voltage was applied at 5000 volts and the time for the electric field to decay to less than 50 volts was measured.

Adhesion of Adhesive Layer To Tape

In the Examples below, the ability of the adhesive to remain adhered to the tape when the tape was removed from a surface was measured by a 90° peel adhesion test conducted as follows:

Using thumb pressure, the backing of a 1.6 cm×10 cm piece of the tape to be tested was adhered to a clean, 5 cm ×13 cm stainless steel plate by means of a double-sided adhesive tape (No. 411 Tape from 3M Co). The liner covering the adhesive of the test tape was removed and the adhesive bearing side of a 1.3 cm by 15 cm strip of a masking tape (No. 254 Masking Tape from 3M Co.) was adhered to the adhesive of the test tape under the weight of a 2 kg hard rubber covered steel roller, with 2 passes in each direction.

The test panel was mounted on a sled and clamped horizontally in the lower jaw of an Instron tensile testing machine. The free end of the masking tape was clamped in the upper jaw of the tensile tester. The jaws were then separated at approximately 30 cm/minute at an angle of 90°. The force required to completely remove the adhesive from the test tape was recorded. Results were measured in ounces per ½ inch of width, and converted to Newtons/100 millimeters (N/100 mm). For Comparative Example 5 the sample area was limited. Therefore, the results were measured in ounces per ¼ inch and multiplied by 2 before converting to N/100 mm.

Adhesion to Glass

The adhesion of the pressure sensitive adhesive tapes was measured on glass which had been sequentially cleaned with diacetone alcohol and heptane. The test was performed using a Model 3M90 slip/peel tester made by Instrumentors, Inc. by peeling at a rate of 229 cm/min (90 in/min) at an angle of 180°.

Vanadium Oxide Sol Preparation

A series of vanadium oxide sols were prepared as described below. The surface concentration of vanadium reported below was calculated from formulation data assuming the density of each vanadium oxide coating solution to be that of water (1 g/mL), and the wet coating thickness obtained with a No. 3 Mayer bar to be 6.9 micrometers and the wet coating thicknesses obtained with other Mayer bars to be similarly proportional to the Mayer bar number. An Inductively Couple Plasma (ICP) Spectroscopic analysis of vanadium surface concentration of several subsequently coated polyester film samples showed that the actual vanadium surface concentration was consistently 40% of that calculated from the amount coated from a particular concentration of coating dispersion.

Preparation "A"

A vanadium oxide sol was prepared by adding VO(O-iBu)$_3$ (15.8 g,. 0.055 mol, product of Akzo Chemicals, Inc., Chicago, Ill.) to a rapidly stirred solution of H$_2$O$_2$ (1.56 g 30% aqueous solution, 0.0138 mol, Mallinckrodt, Paris, Ky.) in deionized water (252.8 g), to provide a solution with vanadium concentration=0.22 moles/kg (2.0% V$_2$O$_5$). Upon addition of VO(O-iBu)$_3$, the mixture became dark brown and gelled within five minutes. With continued stirring, the dark brown gel broke up giving an inhomogeneous viscous dark brown solution which was homogeneous in about 45 minutes. The sample was allowed to stir for 1.5 hours at room temperature and was diluted with an equal weight portion of deionized water (DI H$_2$O) then transferred to a polyethylene container and aged in a constant temperature bath at 60° C. for 4 days to give a dark brown thixotropic gel. The concentration of V(+4) in the gel was determined by titration with potassium permanganate to be 0.072 moles/kg. This corresponds to a mole fraction of V(+4) [i.e., V(+4)/total vanadium] of 0.33.

Preparation "B"

A V$_2$O$_5$ dispersion was prepared according to U.S. Pat. No. 4,203,769. V$_2$O$_5$ (15.6 g, 0.086 mol, Aldrich Chemical Co., Milwaukee, Wisc.) was heated in a covered platinum crucible for 10 minutes at 1100° C. and then poured into 487 g of rapidly stirring DI H$_2$O. The resulting liquid plus gelatinous black precipitate was warmed to 40°–45° C. for 10 minutes and allowed to stir for 1 hour at room temperature to give a soft, thixotropic black gel which was diluted with 1041 g DI H$_2$O to give a 1.0% V$_2$O$_5$ dispersion. The viscous colloidal dispersion was filtered to remove undispersed V$_2$O$_5$.

Preparation "C"

A V$_2$O$_5$ dispersion was prepared by an ion exchange process. Sodium metavanadate (6.0 g, 0.049 mol, Alfa Products, Ward Hill, Mass.) was dissolved by warming in 144 g deionized H$_2$O and the resulting solution was filtered to remove insoluble material. The filtered solution was pumped through a 15 mm×600 mm chromatography column containing 600 mL of Amberlite IR 120 Plus (H$^+$) and diluted with DI H$_2$O to give a light orange solution containing 2.0% V$_2$O$_5$. The solution became a soft opaque brick red gel upon standing at room temperature for 24 hours. The dispersion had aged for 14 months at room temperature before use in coatings.

Sulfopolyester Preparation

Preparation "A"

A one gallon polyester kettle was charged with 126 g (6.2 mole %) dimethyl 5-sodiosulfoisophthalate (Pfister Chemical, Ridgefield, N.J.), 625.5 g (46.8 mole %) dimethyl terephthalate (Amoco Chemical Co., Chicago Ill.), 628.3 g (47.0 mole%) dimethyl isophthalate (Amoco Chemical Co.), 854.4 g (200 mole % glycol excess) ethylene glycol, Aldrich Chemical Co., Milwaukee, Wisc., 365.2 g (10 mole% 22 weight % in final polyester) polycaprolactone diol (trade designation PCP-200™, Union Carbide, Danbury Conn.), 0.7 g antimony oxide (Fisher Scientific Co., Fairlawn N.J.), and 2.5 g sodium acetate. The mixture was heated with stirring to 180° C. at 138 Kpa (20 psi) under nitrogen, at which time 0.7 g zinc acetate was added. Methanol evolution was observed. The temperature was increased to 220° C. and held for 1 hour. The pressure was then reduced, vacuum applied (0.2 Torr), and the temperature increased to 260° C. The viscosity of the material increased over a period of 30 minutes, after which time a high molecular weight, clear, viscous sulfopolyester was drained. This sulfopolyester was found by DSC to have a Tg of 41.9° C. The theoretical sulfonate equivalent weight was 3954 g polymer per mole of sulfonate. 500 g of the polymer were dissolved in a mixture of 2000 g water and 450 g isopropanol at 80° C. The temperature was then raised to 95° C. in order to remove the isopropanol and a portion of the water, yielding a 21% solids aqueous dispersion.

Preparation "B"

A one gallon polyester kettle was charged with 151.2 g (8.5 mole) dimethyl 5-sodiosulfoisophthalate, 833.5 g (71.5 mole %) dimethyl terephthalate, 233.2 g (20 mole %) dimethyl isophthalate, 745.1 g (200 mole %) ethylene glycol, 637.0 g polycaprolactonediol (PCP-0200, 20 mole %, 36 weight of the resulting polyester), 0.6 g antimony oxide, and 3.0 g sodium acetate. The mixture was heated with stirring to 180° C. at 138 Kpa (20 psi) under nitrogen, at which time 0.7 g zinc acetate (an esterification catalyst) was added. The polymerization proceeded according to the procedure used for preparing sulfopolyester "A". A tough, clear sulfopolyester resulted from the polymerization. This sulfopolyester was found by DSC to have a $T_g$ of 21.8° C. The theoretical sulfonate equivalent weight was 3462 g polymer per mole of sulfonate.

A 21% solids aqueous dispersion was obtained using the procedure disclosed above for sulfopolyester A. A cast, dried film of this sulfopolyester had a tensile strength at break of 16,260 Kpa (2358 psi), with an elongation at break of 387%.

Tape Backing Preparation

A series of tape backings coated with a vanadium oxide colloidal dispersion were prepared. The dispersions were applied to a polymeric support using a Mayer bar and dried for five minutes at 100° C. The coating compositions, Mayer bar used and support used are set out in Table 1.

EXAMPLES 1–4 AND COMPARATIVE EXAMPLE 1

These Examples demonstrate the preparation of tapes comprising a backing film of PET, an antistatic layer containing vanadium oxide, and an adhesive layer of isooctylacrylate/acrylamide copolymer over the antistatic layer.

A pressure sensitive adhesive composition was prepared. A copolymer of isooctyl acrylate and acrylamide was prepared by providing a mixture of 150 g ethyl acetate, 96 g isooctyl acrylate, 4 g acrylamide and 0.37 g benzoyl peroxide. The mixture was purged with nitrogen and brought to 55° C. with agitation. Polymerization started after about one hour and the batch gradually thickened. An additional 0.25 g of benzoyl peroxide was added after 3–4 hours and another

TABLE 1

| Backing No. | Prep. | $V_2O_5$ Wgt. (g) | $V_2O_5$ Conc. (Wgt. %) | Sulfopolymer A Weight (g) | Sulfopolymer A Conc. (Wgt. %) | Surfactant (Wgt. g) | DI $H_2O$ (g) | Mayer Bar (No.) | Support |
|---|---|---|---|---|---|---|---|---|---|
| 1 | A | 4.5 | 1 | | | 0.3 | 27.2 | 3 | PET[a] |
| 2 | B | 9 | 1 | | | 0.3 | 20.7 | 3 | PET[a] |
| 3 | C | 3 | 2 | | | 0.1 | 6.9 | 3 | PET[a] |
| 4 | A | 1.5 | 1 | 2.5 | 21 | 0.3 | 15.9 | 6 | PET[a] |
| 5 | A | 4.5 | 1 | | | 0.3 | 27.2 | 3 | Vinyl[b] |
| 6 | B | 9 | 1 | | | 0.3 | 20.7 | 3 | PVC[c] |
| 7 | C | 3 | 2 | | | 0.2 | 6.9 | 3 | PVC[c] |
| 8 | A | 1.5 | 1 | | | 0.6 | 15.9 | 6 | PVC[c] |
| 9 | A | 4.5 | 1 | | | 0.3 | 27.2 | 3 | Polyimide[d] |
| 10 | B | 9 | 1 | | | 0.3 | 20.7 | 3 | Polyimide[d] |
| 11 | C | 3 | 2 | | | 9,1 | 6.9 | 3 | Polyimide[d] |

[a]Untreated and unprimed poly(ethylene terephthalate), 0.1 mm thick.
[b]Non adhesive side of plasticized vinyl surface of YR4737 Fine Line Tape from 3M Company.
[c]Untreated and unprimed PVC film, 0.1 mm thick.
[d]Untreated and unprimed Kapton ™ film from Dupont, 0.04 mm thick.

The dispersions were prepared by combining DI $H_2O$, Triton X-100 surfactant (10%) and the $V_2O_5$. Sulfopolymer A was included in one coating.

The calculated surface concentration of vanadium on each backing and the static decay time for each backing were measured. The results are shown in Table 2.

TABLE 2

| Backing No. | Vanadium Surface Concentration (mg/m²) | Static Decay (Second) |
|---|---|---|
| 1 | 5.8 | 0.01 |
| 2 | 11.6 | 0.01 |
| 3 | 23.2 | 0.05 |
| 4 | 5.8 | 0.01 |
| 5 | 5.8 | 0.01 |
| 6 | 11.6 | 0.01 |
| 7 | 23.2 | 0.02 |
| 8 | 5.8 | 0.01 |
| 9 | 5.8 | 0.01 |
| 10 | 11.6 | 0.01 |
| 11 | 23.2 | 0.05 |

A series of pressure sensitive adhesive tapes were prepared. In each case, a pressure sensitive adhesive composition was coated onto the backing using a Mayer bar and then dried at 100° C. for 5 minutes. The static decay time and the adhesion of the vanadium oxide layer to the tape construction was determined by a 90° peel test. The tape constructions and the results of the tests are set out below.

0.25 g added after 7–8 hours. Heating was continued for a further 6 hours. The mixture was diluted with 250 g heptane to give a pressure sensitive adhesive coating composition.

The adhesive coating solution was coated onto the antistatic layer of tape backings 1–4 and an untreated, unprimed PET having no antistatic layer using a No. 55 Mayer bar and dried at 100° C. for five minutes. The static decay time for the tapes and the adhesion of the adhesive layers to the tape are reported in Table 3.

TABLE 3

| Example | Tape Backing | Static Decay (Second) | Adhesion to Tape (N/100 mm) |
|---|---|---|---|
| 1 | 1 | 0.01 | 30 |
| 2 | 2 | 0.01 | 30 |
| 3 | 3 | 0.02 | 27 |
| 4 | 4 | 0.01 | 28 |
| C-1 | PET | No Static Decay | 24 |

These examples show that antistatic layers of vanadium oxide can be inserted between PET film backing and acrylate adhesive layers with no material effect on the adhesion of the adhesive layer to the tape while providing excellent antistatic properties.

EXAMPLES 5–8 AND COMPARATIVE EXAMPLE 2

These Examples demonstrate the preparation of tapes comprising a backing film of PET, an adhesive layer of block copolymer, and an antistatic layer containing vanadium oxide.

An adhesive coating solution containing 40 weight % Kraton 1107-100 block copolymer (Shell Chemical Co., Houston, Tex.) and 60 weight % Wingtack 100 (Goodyear Tire and Rubber Co., Akron, Ohio) plus 1 part per hundred of Kraton 1107/Wingtack 100 of a phenolic antioxidant in toluene solution was applied to the antistatic layer tape backings 1–4 and an untreated, unprimed PET having no antistatic layer using a No. 36 Mayer bar and dried at 100° C. for five minutes. The static decay times and the adhesion of the adhesive layer to the tapes are shown in Table 4.

TABLE 4

| Example | Tape Backing | Static Decay (Second) | Adhesion to Tape (N/100 mm) |
|---|---|---|---|
| 5 | 1 | 0.01 | 48 |
| 6 | 2 | 0.01 | 45 |
| 7 | 3 | 0.05 | 36 |
| 8 | 4 | 0.01 | 39 |
| C-2 | PET | No Static Decay | 48 |

These Examples show that antistatic layers of vanadium oxide can be inserted between PET film backing and block copolymer adhesive layers with no material effect on the adhesion of the adhesive layer to the tape while providing excellent antistatic properties.

EXAMPLES 9–12 AND COMPARATIVE EXAMPLE 3

These Examples demonstrate the preparation of antistatic tapes comprising a backing film of PET, a rubber resin adhesive layer, and an antistatic layer containing vanadium oxide.

An adhesive coating solution containing 12% NR-SIR-3L (natural rubber, Cargill Co., Minnetonka, Minn.), 6.0% Escorez 1310 (Exxon Chemical Co., Houston, Tex.) and 0.2% phenolic antioxidant (Wingstay L, available from Goodyear Tire & Rubber, Akron, Ohio) was applied to the antistatic layer of the antistatic tape backings 1–4 and to an untreated, unprimed PET layer having no antistatic layer using a No. 36 Mayer bar and dried at 100° C. for five minutes. The static decay times and the adhesion of the adhesive layer to the tapes are shown in Table 5.

TABLE 5

| Example | Tape Backing | Static Decay (Second) | Adhesion to Tape (N/100 mm) |
|---|---|---|---|
| 9 | 1 | 0.01 | 11 |
| 10 | 2 | 0.01 | 11 |
| 11 | 3 | 0.02 | 11 |
| 12 | 4 | 0.01 | 12 |
| C-3 | PET | No Static Decay | 12 |

These Examples show that antistatic layers of vanadium oxide can be inserted between PET film backing and rubber resin adhesive layers with no material effect on the adhesion of the adhesive layer to the tape while providing excellent antistatic properties.

EXAMPLES 13–16 AND COMPARATIVE EXAMPLE 4

These Examples demonstrate the preparation of antistatic tapes comprising a backing film of polyvinyl chloride (PVC), an adhesive layer of isooctylacrylate/acrylamide copolymer, and an antistatic layer containing vanadium oxide. An adhesive coating solution prepared as described in Examples 1–4 was coated onto the antistatic layer of the tape backings 5–8 and to unprimed and untreated PVC film having no antistatic layer using a No. 55 Mayer bar and dried at 100° C. for five minutes. Decay times and the adhesion of the adhesive layer to the tapes are presented in Table 6.

TABLE 6

| Example | Tape Backing | Static Decay (Second) | Adhesion to Tape (N/100 mm) |
|---|---|---|---|
| 13 | 5 | 0.01 | 32 |
| 14 | 6 | 0.01 | 42 |
| 15 | 7 | 0.05 | 37 |
| 16 | 8 | 0.01 | 21 |
| C-4 | PVC | No Static Decay | 27 |

These Examples show that antistatic layers of vanadium oxide can be inserted between PVC film backing and acrylate adhesive layers with no material effect on the adhesion of the adhesive layer to the tape while providing excellent antistatic properties.

EXAMPLES 17–19 AND COMPARATIVE EXAMPLE 5

These Examples demonstrate the preparation of antistatic tapes comprising a backing film of polyimide, a silicone adhesive layer, and an antistatic layer containing vanadium oxide.

A primer solution containing 13.3% GE 1135-1 Silicone, 0.7% GE SS4192C catalyst, 0.7% GE SS4259C catalyst (all products of General Electric, Waterford, N.Y.) and 85% toluene was applied on top of the antistatic layer of tape backings 9–11 and a polyimide having no antistatic layer using a No. 12 Mayer bar and dried at 94° C. for one minute. Silicone adhesive AX-F-2014 (Dow Chemical, Midland, Mich.) was then coated onto the antistatic layer of backings 9–11 and the primed polyimide films using a No. 44 Mayer bar and dried at 177° C. for five minutes. The static decay times and the adhesion of the adhesive layer to the tapes shown in Table 5.

TABLE 7

| Example | Tape Backing | Static Decay (Second) | Adhesion to Tape (N/100 mm) |
|---|---|---|---|
| 17 | 9 | 0.01 | 42 |
| 18 | 10 | 0.01 | 38 |
| 19 | 11 | 0.05 | 37 |
| C-5 | Polyimide | No Static Decay | 53 |

These Examples show that antistatic layers of vanadium oxide can be inserted between polyimide film backing and silicone primer/adhesive layers with no material effect upon the adhesion of the adhesive layer to the tape while providing excellent antistatic properties.

EXAMPLE 20 AND COMPARATIVE EXAMPLE 6

This Example demonstrates the preparation of an antistatic tape wherein an antistatic layer comprising vanadium oxide is coated between primer and adhesive layers. A coating solution was prepared by adding 27.2 g deionized water and 0.3 g 10% Triton X-100 surfactant to 4.5 of 1% colloidal vanadium oxide prepared as described in Vanadium Oxide Preparation A. The coating solution was applied to PVDC primed PET film (prepared as disclosed in U.S. Pat. No. 4,203,769, col. 15, lines 13–34) using a No. 3

Mayer bar and dried for five minutes at 100° C. to give a primed, antistatic tape backing. The static decay time of the antistatic tape backing was 0.01 second. An adhesive coating solution prepared as described in Examples 1–4, Adhesive Preparation 1 was coated onto the antistatic layer using a No. 55 Mayer bar and dried at 100° C. for five minutes to give an antistatic tape. The static decay time of the tape was 0.01 second. The adhesion of the adhesive layer to the tape was 33N/100 mm.

In a separate experiment the adhesive coating prepared as described in Examples 1–4 was coated was coated onto PVDC primed PET film having no antistatic layer using a No. 55 Mayer bar and dried at 100° C. for five minutes. The non-antistatic tape did not exhibit decay of a triboelectrically generated charge and could not be charged by an Electrotech Static Decay Meter. The adhesion of the adhesive layer to the tape was 33N/100 mm.

EXAMPLE 21

This Example demonstrates the preparation of an antistatic tape backing wherein an antistatic layer comprising vanadium oxide is coated between the tape substrate polymer and low adhesion (release) layers. A low adhesion backsize coating solution containing 57% poly(vinyl-N-octadecylcarbamate in 20% xylene/80% toluene was coated over the antistatic layer of the antistatic tape backing prepared as described for Backing 9 using a No. 12 Mayer bar and dried at 100° C. for one minute. The coated sample had static decay time=0.01 second and there was excellent adhesion of the coatings to the polyimide substrate. The backing can be coated with a pressure sensitive adhesive to form an antistatic pressure sensitive adhesive tape.

EXAMPLE 22

Example 22 demonstrates the coating of an antistatic layer of vanadium oxide over an adhesive layer. A coating solution was prepared by adding the following ingredients sequentially: 6.2 g deionized water, 2.5 g diacetone alcohol, 10 g ethanol, and 2 g isobutanol to 1.5 g of 1% colloidal vanadium oxide prepared as described in Vanadium Oxide Preparation A. The coating solution contained 0.038 weight percent vanadium and was applied to the adhesive side of No. 850 transparent tape (acrylic adhesive on polyester backing, available from 3M Co., St. Paul Minn.) using a No. 3 Mayer bar and dried for five minutes at 100° C. The resulting antistatic tape had a surface concentration of vanadium (on the adhesive layer) of 2.6 mg/m$^2$.

EXAMPLE 23

Example 22 was repeated except the vanadium oxide coating solution was made by adding the following ingredients sequentially: 4.7 g deionized water, 2.5 g diacetone alcohol, 10 g ethanol, and 2 g isobutanol to 3.0 g of 1% colloidal vanadium oxide prepared as described in Vanadium Oxide Preparation B. The resulting antistatic tape had a surface concentration of vanadium on the adhesive layer of 5.2 mg/m$^2$.

EXAMPLE 24

Example 22 was repeated except that the vanadium oxide coating solution contained vanadium oxide prepared by vanadium oxide Preparation C. It was made by adding the following ingredients sequentially: 1.6 g deionized water, 1.6 g diacetone alcohol, 5 g ethanol, and 1.3 g isobutanol to 1.5 g of the colloidal vanadium oxide. The resulting antistatic tape had a surface concentration of vanadium on the adhesive layer of 10.5 mg/m$^2$.

The static decay times and adhesion to glass of the tape of Examples 22, 23, and 24 and commercially available No. 850 tape (a tape having no antistatic layer thereon) are presented in Table 8.

TABLE 8

| Example | Static Decay (Second) | Adhesion to Glass (N/100 mm) |
|---|---|---|
| 22 | 0.02 | 38 |
| 23 | 0.01 | 33 |
| 24 | 0.04 | 31 |
| 850 Tape | No Static Decay | 36 |

These Examples show that an adhesive layer can be overcoated with the colloidal vanadium oxide to give an antistatic tape without substantially reducing the adhesion of the tape.

EXAMPLE 25

Deionized water (138.8 g) and sulfopolyester B (46.2 g of a 26% dispersion) were added to 15.0 grams of vanadium oxide dispersion prepared by the method of Vanadium Oxide Preparation A to give a solution with a weight ratio vanadium:sulfopolyester of 2:143.

The dispersion was coated onto PVDC primed polyester (100 micrometer thick, 0.004 inches) using a No. 14 Mayer Bar. The coating was dried at 80° C. for 2 minutes. A pressure sensitive (psa) transfer adhesive construction (3M product designation #467mp) was applied to the coated side of the PVDC primed polyester. The release liner was removed and the coated construction (psa tape) having a layer of psa overlying the antistatic layer of the invention was tested for static decay. The static decay time was measured at 0.06 second. A sample containing no vanadium oxide exhibited no static decay.

In another embodiment a psa tape can be provided having a layer of psa on a surface of the substrate opposite to that having the antistatic layer. Either of these tape embodiments, which can further comprise a layer of a low adhesion backsize directly over the psa or on the back side of the substrate, can be rolled up to provide a roll of psa tape.

Various modifications and alterations of this invention will become apparent to those skilled in the art without departing from the scope and spirit of this invention, and it should be understood that this invention is not to be unduly limited to the illustrative embodiments set forth herein.

We claim:

1. An adhesive tape or sheet comprising (a) an exposed adhesive layer selected from the group consisting of pressure sensitive adhesives, and heat or radiation activated adhesives, and (b) a sufficient concentration of vanadium oxide so as to impart antistatic properties to the tape or sheet.

2. The adhesive tape or sheet according to claim 1 wherein said vanadium oxide is included in said adhesive layer.

3. The adhesive tape or sheet according to claim 1 wherein said vanadium oxide is coated onto at least one surface of said adhesive layer.

4. The adhesive tape or sheet according to claim 1 further comprising (c) a support layer.

5. The adhesive tape or sheet according to claim 4 wherein said vanadium oxide is coated on at least one surface of said support, and said vanadium oxide is overcoated with said adhesive layer.

6. An adhesive tape or sheet comprising an adhesive layer coated on a first surface of a support layer, and a sufficient concentration of a vanadium oxide coated over said adhesive layer so as to impart antistatic properties to the tape or sheet.

7. The adhesive tape or sheet according to claim 4 wherein said vanadium oxide is included in said adhesive layer.

8. A pressure sensitive adhesive tape or sheet comprising an exposed pressure sensitive adhesive layer and a sufficient concentration of vanadium oxide so as to impart antistatic properties to the tape or sheet.

9. The adhesive tape or sheet according to claim 6 further comprising a low adhesion backsize on a second and opposite surface of said support.

10. A pressure sensitive adhesive tape or sheet comprising (a) a support layer, (b) an exposed pressure sensitive adhesive layer and (c) a dried product of an aqueous dispersion of vanadium oxide.

11. The pressure sensitive adhesive tape or sheet according to claim 10 wherein said support is a polymer film.

12. The pressure sensitive adhesive tape or sheet according to claim 11 wherein said polymer film is polyester film.

13. The pressure sensitive adhesive tape or sheet according to claim 10 wherein said support is a fibrous material.

14. An adhesive tape or sheet comprising a support layer having first and second opposite parallel surfaces, a pressure sensitive adhesive layer on said first surface of said support, a dried aqueous dispersion of a vanadium oxide, and a layer of a low adhesion backsize on said second surface.

15. The adhesive tape or sheet according to claim 8, said tape or sheet being capable of being wound in the form of a roll.

16. The adhesive tape or sheet according to claim 9 further comprising an aqueous mixture comprising a colloidal vanadium oxide and a dispersed sulfopolymer.

17. The adhesive tape or sheet according to claim 4 wherein said support is electrically non-conductive.

18. The adhesive tape or sheet according to claim 4 wherein said support is electrically conductive.

19. The adhesive tape or sheet according to claim 4 wherein said support is a polymer film.

20. The adhesive tape or sheet according to claim 19 wherein said polymer film is a polyester film.

21. The adhesive tape or sheet according to claim 4 wherein said support is a fibrous material.

22. The adhesive tape or sheet according to claim 4 wherein said support is a siliceous or ceramic material.

23. The adhesive tape or sheet according to claim 16 wherein said mixture has been dried.

24. The adhesive tape or sheet according to claim 4 wherein said support has first and second opposite parallel surfaces, said adhesive layer is on a said first surface of said support, said tape or sheet further comprising a layer of a law adhesion backsize on said second surface of said support.

25. The adhesive tape or sheet according to claim 24 which is capable of being wound in the configuration of a roll of tape.

26. An adhesive tape or sheet comprising (a) an exposed adhesive layer capable of being adhered to a surface by the application of pressure, heat, and radiation, and (b) a sufficient amount of vanadium oxide anywhere in said tape or sheet so as to impart antistatic properties to said tape or sheet.

27. The adhesive tape or sheet according to claim 5 further comprising a sulfopolymer with the vanadium oxide coated on at least said one surface of said support.

28. The adhesive tape or sheet according to claim 4 further comprising a sulfopolymer.

29. The adhesive tape or sheet according to claim 28 wherein said vanadium oxide and said sulfopolymer are included in said adhesive layer.

30. The adhesive tape or sheet according to claim 4 wherein said adhesive layer is on a first surface of said support layer and said vanadium oxide is on a second surface of said support layer, wherein said first and second surfaces are on opposite sides of said surface.

31. The adhesive tape or sheet according to claim 4 wherein said adhesive layer is a pressure sensitive adhesive.

* * * * *

UNITED STATES PATENT AND TRADEMARK OFFICE
CERTIFICATE OF CORRECTION

PATENT NO.:   5,637,368
DATED:        June 10, 1997
INVENTOR(S):  David A. Cadalbert, et al.

It is certified that error appears in the above-identified patent and that said Letters Patent is hereby corrected as shown below:

Column 19, line 6, "is included in" should read --is incorporated into--

Column 19, line 32, "claim 9" should read --claim 4--

Signed and Sealed this

Fifth Day of December, 2000

Attest:

Q. TODD DICKINSON

*Attesting Officer*          *Director of Patents and Trademarks*